C. R. Merriam,
Horse Rake.
No. 110,771.   Patented Jan. 3, 1871.
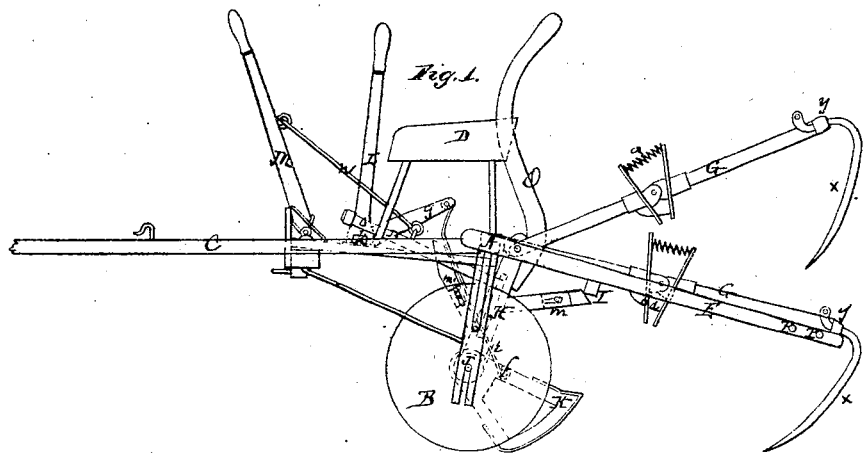
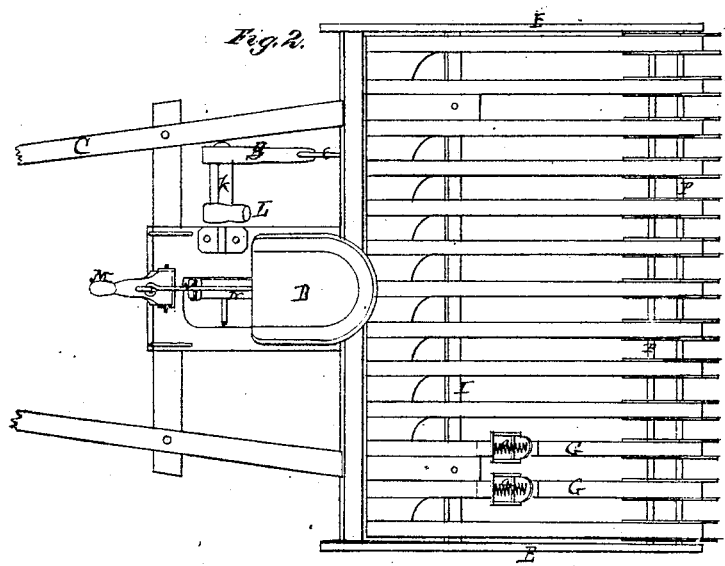
Witnesses
Jno. A. Ellis
J. V. White
Inventor
Charles Rollin Merriam
Per
J. H. Alexander
Atty

United States Patent Office.

CHARLES ROLLIN MERRIAM, OF MIDDLEBURY, VERMONT, ASSIGNOR TO HIMSELF AND W. H. MERRIAM, OF STRATFORD, NEW HAMPSHIRE.

Letters Patent No. 110,771, dated January 3, 1871.

IMPROVEMENT IN HORSE HAY-RAKES.

The Schedule referred to in these Letters Patent and making part of the same.

*To all whom it may concern:*

Be it known that I, CHARLES ROLLIN MERRIAM, of Middlebury, in the county of Addison and State of Vermont, have invented certain new and useful Improvements in Hay-Rakes; and I do hereby declare that the following is a full, clear, and exact description thereof, reference being had to the accompanying drawings and to the letters of reference marked thereon which form a part of this specification.

The nature of my invention consists in the construction and arrangement of an improved "horse hay-rake," as will be hereinafter fully set forth.

In order to enable others skilled in the art to which my invention appertains to make and use the same, I will now proceed to describe its construction and operation, referring to the annexed drawings, in which—

Figure 1 is a side elevation; and
Figure 2, a plan view of my rake.

A represents a bar of suitable dimensions, having, near each end on its under side, two standards, between which the wheels B are suitably pivoted.

From the bar A the shafts C C project forward, and a platform is suitably arranged for supporting the driver's seat D.

From each end of the bar A an arm, E, extends downward and toward the rear.

In ears on the rear side of the bar A is placed a rod, upon which all the rake-teeth are hinged. These teeth form an acute angle, and in the long arm G of each tooth is a joint, in which is a spring, *a*, slot *b*, and guide *d*, or their equivalents, arranged as shown in fig. 1, to keep the teeth steady and in place.

This joint is to prevent breakage of teeth, when an obstruction is met, as the teeth then assume a perpendicular position, and the arm G, working on the rod connecting it to the frame, flies up, leaving the tooth free to drop again into position.

On the same rod which connects the tooth-arms G G to the frame is also hinged a frame, H, and a supporting-bar, I.

In the lower part of the hinged frame H is a revolving bar, J, to each end of which is attached a cam, K.

One of these cams is, by a pitman, *e*, crank *f*, arm *g*, and journal *h*, connected with a lever, L, by means of which the teeth are elevated.

By a slight sudden movement of the lever L forward, the cams K K are thrown over forward; the longest point striking the surface of the ground, causes the whole to rise at once, as they revolve under, and then on the periphery of the receding circle let the teeth gradually fall to the ground.

On the hinged frame H are adjustable studs *m m*, which, when the frame is thrown upward, strike the supporting-bar I.

Each of the studs *m* is made of two pieces secured together by a screw, which screw passes through an elongated slot in one of said pieces, so that the studs can readily be lengthened and shortened at will.

By throwing the lever L back, and dropping it on the frame, the studs *m m* raise the supporting-bar I, and consequently elevate the teeth, holding them firmly in place for transporting from one field or place to another.

By adjusting the elevating-studs *m m*, the elevating of the teeth to heavy or light work, as may be required, is readily regulated.

The lever M, in front connected by a pitman, *n*, to a bar, N, hinged to the frame H, and having a similar adjustable stud, *m'*, bearing on said frame, is for the purpose of partially elevating the teeth for backing.

Another lever, O, attached to the hinged frame H, can be used for the same purpose; also, to discharge the load by hand, when required.

The clearing-bars P P, placed under the tooth-arms G G, in the arms E E of the frame, and over the points of the teeth, are used, in combination with the mechanism, to free the teeth of their load quickly and surely, rendering uniform work.

*x x* represent the rake-teeth, the upper ends of which, it will be observed, are turned upward and provided with a hole.

*y y* are ferrules fitting on the ends of the arms G G.

I place a tooth on each side of each arm through the ferrule, and then connect the two teeth by slipping a pin through the holes in their heads, so that the said pin will rest upon the upper side of the arm.

It will thus be seen that I not only securely fasten the teeth, but divide the strain to which they are subjected between the ferrule and the pin.

The driver, from his seat D, has full control of the whole rake.

Having thus fully described my invention,
What I claim as new, and desire to secure by Letters Patent, is—

1. The adjustable elevating-studs *m m*, attached to the hinged frame H, in combination with supporting-bar I, substantially as and for the purpose set forth.

2. The combination of frame H, bar N, and adjustable stud $m'$, with adjustable studs $m\ m$, and elevating-bar I, substantially as described.

3. The jointed arm G, provided with guides $d$, slot $b$, and spring $a$, as and for the purpose set forth.

4. The teeth $x\ x$, constructed as described, in combination with arm G, ferrule $y$, and the pin which connects the teeth, all arranged substantially as set forth.

In testimony that I claim the foregoing as my own, I affix my signature in presence of two witnesses.

CHARLES ROLLIN MERRIAM.

Witnesses:
 AMASA S. TRACY,
 GEO. W. PINNEY.